March 23, 1971    D. J. LEMENS    3,572,144
ACTUATING MECHANISM

Filed April 29, 1969    2 Sheets-Sheet 1

Inventor:
Donald J. Lemens
By Richard C. Ruppin
Atty.

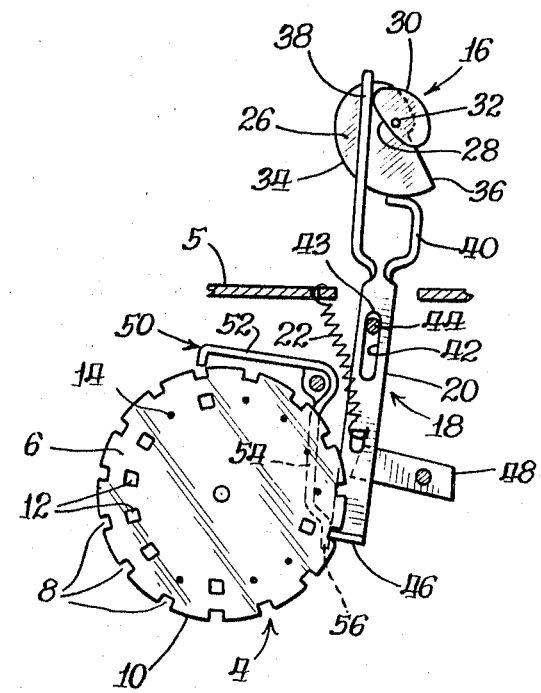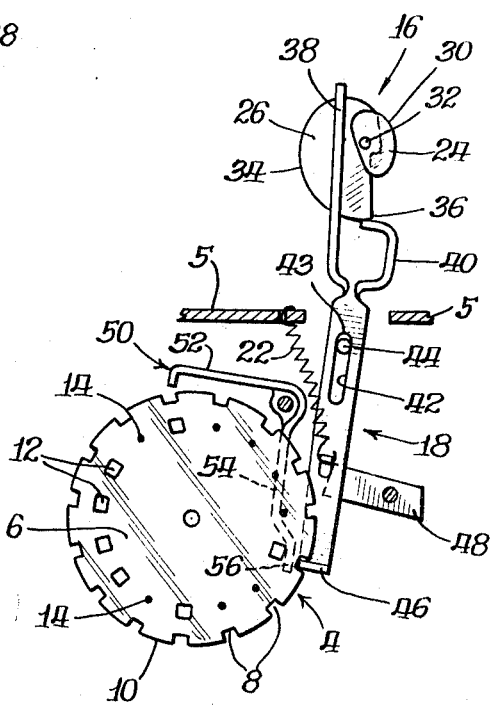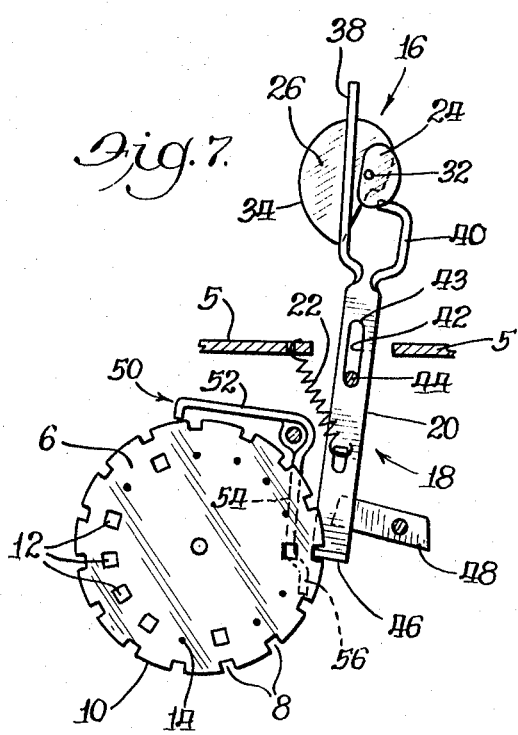

United States Patent Office 3,572,144
Patented Mar. 23, 1971

3,572,144
ACTUATING MECHANISM
Donald J. Lemens, South Milwaukee, Wis., assignor to McGraw-Edison Company, Elgin, Ill.
Filed Apr. 29, 1969, Ser. No. 820,051
Int. Cl. F16h 27/02
U.S. Cl. 74—142
13 Claims

ABSTRACT OF THE DISCLOSURE

An actuating mechanism is disclosed which includes a cam member having two differently shaped cam surfaces for moving a spring loaded actuating member along a path determined by the shape of the cam surfaces. As the actuating member moves along its path, it engages and advances a driven member. The cam surfaces are shaped and positioned relative to the actuating member such that a minimal amount of force and load is transmitted to the cam member by the actuating member.

BACKGROUND OF THE INVENTION

This invention relates to an actuating mechanism and, more particularly, to an actuating device operated by a drive means for advancing a movable member. The invention has particular, but not exclusive, application to systems for the automatic remote reading of utility meters from a central station.

Utility meters, such as electric, gas and water meters, are generally widely distributed at the customers' points of usage. It is the present practice in the reading of such meters for a meter reader to visit each customer's site and to observe and record a registration on each unit. While there have been a large number of proposals for the automatic reading of such meters from a remote location, they have not been commercially adapted because of their high cost and because they could not meet the limitations imposed by existing utility meters and communication systems. Such limitations include the requirement that the encoding device utilized occupy a relatively small space in the utility metering equipment and impose a small mechanical load on the metering equipment. Another requirement is that the actuating means for the encoding device have a positive and precise action in response to the metering equipment.

SUMMARY OF THE INVENTION

It is an object of the invention to provide an economical and simple actuating mechanism for advancing a movable member.

Another object of the invention is to provide an actuating mechanism for advancing a movable member which occupies a small space.

Another object of the invention is to provide an actuating mechanism for advancing a movable member which has a positive and precise action.

Another object of the invention is to provide an actuating mechanism for a movable member connected to a drive source and imposing minimal load and force on the drive source.

A further object of the invention is to provide an economical actuating mechanism connected to a utility meter register for driving a meter reading encoding device and which occupies a relatively small space and has a positive and precise action while imposing a minimal load and force on the meter register.

The objects of the invention are accomplished by providing an actuating mechanism driven by a drive means such as a watthour meter and including a cam having two cam surfaces and an actuating arm. The actuating arm is pivotally mounted and slidable about a pivot point and engages and follows the two cam surfaces along a path on the disc 6. As the disc 6 moves opposite the sens- they move. A driven member which may comprise a disc is positioned to be engaged and advanced by the arm. A resilient means is connected to the actuating arm to hold it in engagement with the cam surfaces and advance the driven member when the actuating arm engages the driven member.

BRIEF DESCRIPTION OF THE DRAWINGS

FIGS. 2–7 are similar front elevational views, partially broken away, of an actuating mechanism mounted on a meter register mechanism and showing the actuating mechanism in progressively changing operational positions.

DESCRIPTION OF THE PREFERRED EMBODIMENT

Figure 1:
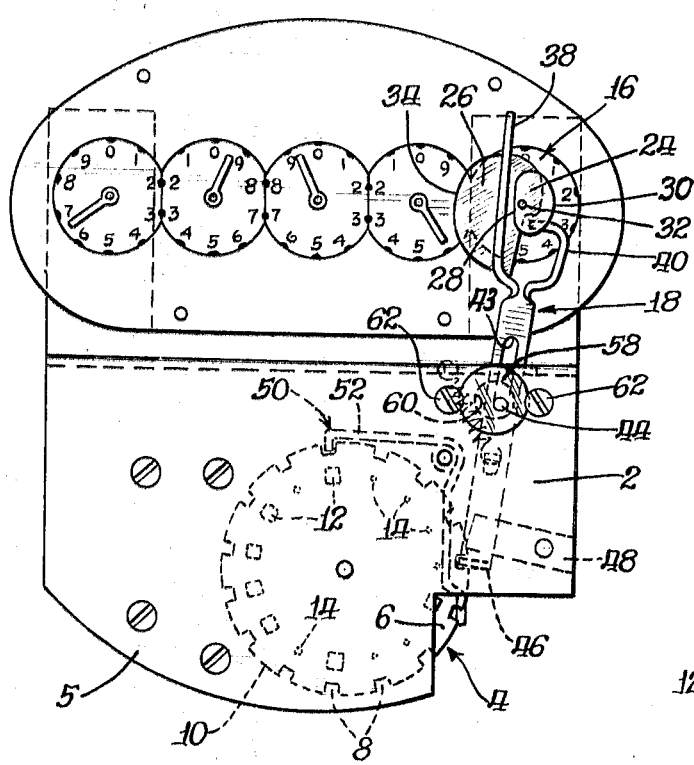
FIG. 1 is a front elevational view of an actuating mechanism mounted on a meter register mechanism.
Figure 2:
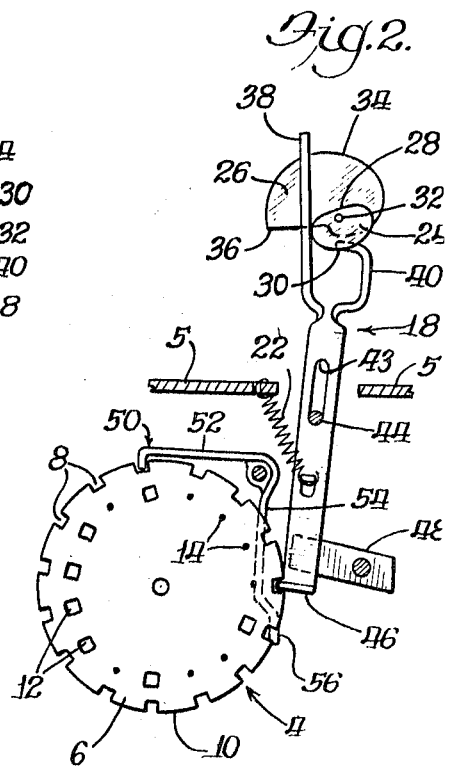

FIG. 1 shows an actuating mechanism 2 and an encoder 4 mounted on a frame 5 of a meter register. The actuating mechanism 2 and the encoder 4, which includes a driven member or disc 6, are suitable for use in an automatic meter reading system. Except for the shape of the inset portions or notches 8 along the edge 10 of the disc 6, the encoder 4 forms no part of the instant invention and may be similar to the encoding device described in copending application Ser. No. 691,020, filed Dec. 15, 1967, and assigned to the assignee of the instant invention. It is sufficient for purposes of understanding the instant invention to note that the disc 6 has a plurality of positions and is rotatable so that each of the positions may be moved opposite a sensing means (not shown). The disc 6 has a plurality of coding units 12 and 14 which respectively comprise holes and opaque positions positioned along a circular path on the disc 6. Als the disc 6 moves opposite the sensing means, the latter will sense the particular combination of coding units 12 and 14 present at the position and produce a coded output indicative of the combination of coding units present at the position. The coding units 12 and 14 are arranged in groups each having a different combination of coding units 12 and 14 so that the encoder 4 will produce a different output for each of its positions.

Referring generally to FIGS. 1–7, the actuating mech. anism 2 is shown to comprise a cam means 16 and an actuating means 18 including an arm 20 and a spring 22. The cam means 16 includes cam members 24 and 26 mounted on the frame 5 and driven by the meter register mechanism. The cam members 24 and 26 are held stationary relative to each other while driven and may be separately mounted or may be mounted together as an integral unit. The cam member 24 includes a surface portion 28 having a minimum radius and a surface portion 30 having a maximum radius with the radius of the cam member 24 increasing from its minimum length to its maximum length and returning to its minimum length as the radius is rotated about the axis 32 of the cam means 16. The cam member 26 has an increasing radius surface and a drop- off point 36 along the surface 34 where the radius of cam member 26 rapidly decreases.

The arm 20 has a follower 38 engaging and following the cam member 24 and a follower 40 engaging and following the cam member 26. The arm 20 has a slot 42 extending along its length and is supported on the frame 5 by a screw 44 projecting through the slot 42. The slot 42 has an upper end 43. As may be seen in FIGS. 1–7, the arm 20 is pivotal about and slidable toward the axis of the screw 44. A guide 48 is also provided for holding the arm 20 in movable engagement with the frame 5. The spring 22 is connected between the frame 5 and the arm 20 adjacent the drive end 46 of the arm 20. The spring 22 urges the followers 38 and 40 respectively against the cam members 24 and 26. The spring 22 also urges the drive end 46 of arm 20 toward engagement with the disc 6 and advances the disc 6. It may be noted that where the drive end 46 engages the disc 6 while the surface 28 of cam member 24 is rotating past follower 38, there will be no engagement between the follower 38 and cam member 24. As described in detail later, the cam members 24 and 26 function to move the arm 20 downward and into engagement with one of the notches 8 on the disc 6 and load the spring 22 whereupon the spring 22 advances the disc 6 upward. As may be readily understood, the described upward and downward directions are merely relative to the views shown in FIGS. 1-7 and are not intended to limit the movement directions of the actuating mechanism 2.

The disc 6 is rotatably mounted on the frame 5 and a gravity weighed stop 50 is provided to limit the degree of advancement of the disc 6 and hold the disc 6 stationary between advancing movements by the arm 20. The stop 50 is pivotally mounted on the frame 5 and has an arm 52 which engages the notches 8 as the disc 6 is advanced. The stop 50 includes a depending arm 54 having an offset portion 56 positioned adjacent the disc 6 so that it may be engaged by the arm 20 when the latter moves into engagement with the disc 6. In this manner, the stop 50 is pivoted so that the arm 52 releases the disc 6 to free the latter for rotational advancement by the arm 20. As the arm 20 moves upward while advancing the disc 6, the depending portion 56 is released and the weight of stop 50 causes the arm 52 to move downward into engagement with another notch 8 so that the disc 6 will advance only the distance between each of the notches 8.

It may be appreciated that precise positioning of the arm 20 is required in order for the drive end 46 to move into a notch 8 and then move upward and out of engagement with the disc 6 without causing undue stress on the disc 6 and cam members 24 and 26. To permit such movement and precise positioning, the mounting screw 44 is fastened into a movable receptacle 58 which may be moved within the circumference of the opening 60 in the frame 5. The movable receptacle 58 is held in place by the screws 62 which, when loosened, allow movement of the receptacle 58.

Figure 3:
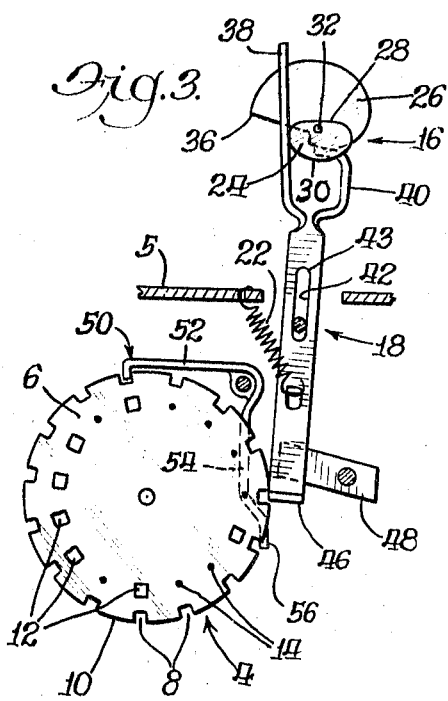
Figure 4:
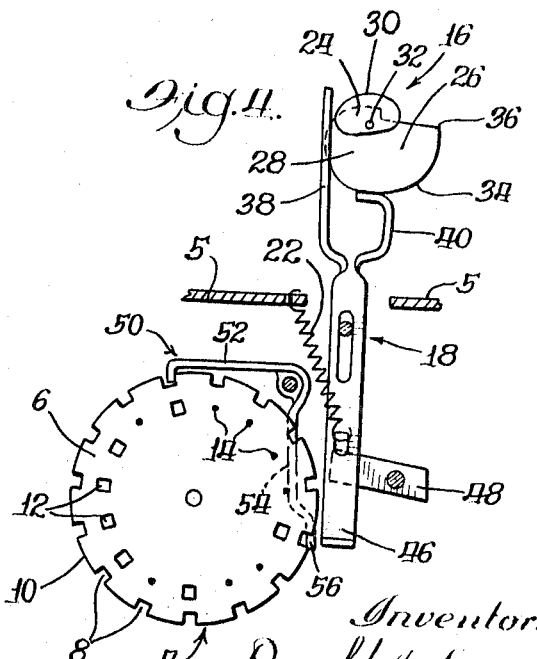

The positions of the cam means 16 and the actuating means 18 as they operate to advance the disc 6 are shown in FIGS. 1-7. With reference to FIG. 1, the arm 20 is shown in a relatively upward position in engagement with a notch 8 of the disc 6 and the followers 38 and 40 are respectively out of engagement with the cam members 24 and 26. As the cam means 16 is rotated clockwise by the meter register the maximum radius surface 30 of cam member 24 engages the follower 38 to pivot the arm 20 about screw 44 and move the arm 20 out of engagement with the disc 6 (see FIG. 2). As shown in FIG. 3, as the cam means 16 is rotated further in the clockwise direction, the surface 30 of cam member 24 continues in engagement with the follower 38 to hold the arm 20 out of engagement with the disc 6 and the increasing radius surface 34 of cam member 26 engages the follower 40 to move the arm 20 relatively downward along a path paralleling and spaced from the edge 10 of the disc 6. The cam means 16 is shown in FIG. 4 just prior to the engagement of the minimum radius surface 28 of cam member 24 with the follower 38 and while the surface 34 of cam member 26 continues to move the arm 20 downward. Further rotation of the cam means 16 to the position shown in FIG. 5 results in the engagement of the surface 28 of cam member 24 with the follower 38 so that the arm 20 is moved toward a notch 8 of disc 6 by force of the spring 22. In FIG. 6, the arm 20 is shown engaged in a notch 8 of the disc 6 so that continued engagement of the follower 38 with the cam member 24 and pivotal movement of the arm 20 by the spring 22 is prevented. When the arm 20 moves into a notch 8, it also engages the arm 54 of stop 50 to release the disc 6. FIG. 6 also shows the engagement of the surface 34 of cam member 26 with the folower 40 just prior to the drop-off point 36 passing the follower 40. In FIG. 7, the cam means 16 and actuating means 18 are shown just after the drop-off point has rotated past the follower 40 to release the follower 40 and arm 20 so that the arm 20 is moved upward in engagement with a notch 8 of disc 6 by the spring 22. As the arm 20 and disc 6 advance upward, the gravity weighed stop 50 is released by the arm 20 and the arm 52 moves downward into another notch 8 to limit advancement of the disc to one position. It may also be noted that the follower 40 does not engage the cam means 16 at the end of its upward movement because the lower end of the slot 42 hits the screw 44 and stops the arm 20 before the follower 40 hits the cam means 16. Also, the follower 38 does not engage the cam means 16 during upward movement of the arm 20 since the follower 38 is prevented from moving towards the cam member 24 by the engagement of the arm 20 with the disc 6 during the entire upward movement of the arm 20. In this manner, the actuating means 18 is prevented from applying any force or load to the cam means 16 and meter register mechanism during advancement of the disc 6.

From the foregoing description, it may be readily seen that the arm 20 is moved along a path comprising substantially four portions which include advancement in a particular driven direction, movement away from a driven member in a direction transverse to that of the driven direction, movement substantially in reverse to that of the driven direction and movement transverse to that of the driven direction and into engagement with the driven member. This path may also be generally described as that of a backward shaped D with the vertical portion of the D being the path of advancement.

It will be appreciated that the actuating mechanism according to the invention is an economical, compact and simple device which is suitable for a remote meter reading installation and other uses wherein minimal load and force on the drive source are required and space and installation costs are extremely important.

While only a single embodiment of the invention has been shown and described, it is not intended to be limited thereby, but only by the scope of the appended claims.

I claim:

1. The combination with a drive means and a driven member of an actuating mechanism comprising cam means having first and second cam surfaces moved by said drive means and maintained stationary relative to each other while moved, actuating means including follower means engaging each of said cam surfaces and being movable along a path determined by the shape of said cam surfaces as the cam surfaces move, said actuating means including arm means having a drive end movable along said path into and out of engagement with the driven member, said arm means being pivotable about and slidable across a common axis, and advancing means responsive to said actuating means while the actuating means is moving along said path to advance said driven member.

2. The combination according to claim 1 wherein said follower means includes a first follower and said first cam surface is rotated by said drive member and has a high radius portion engaging said first follower in a direction tangential to a radius of said axis whereby said arm means is pivoted about said axis as the first cam surface rotates and the drive end is moved along first and third portions of said path.

3. The combination according to claim 2 wherein said follower means includes a second follower and said second cam surface is rotated by said drive means and has a constant rise portion engaging said second follower in a direction extending toward said axis whereby said arm means is slidably moved across said axis as said first cam surface rotates and the drive end is moved along a second portion of said path.

4. The combination according to claim 3 wherein said driven member has a movable surface, said drive end is spaced from said movable surface and moves along the second portion of said path when the arm means is slidably moved across said axis and said movable surface is engaged by and disengaged from the drive end when the arm means is pivoted about said axis and the drive end moves along the first and third portions of said path.

5. The combination according to claim 4 wherein said advancing means is effective when said movable surface is engaged by the drive end to slidably move the arm means across said axis and move said drive end along a fourth portion of said path in the direction of advancement of the driven member.

6. The combination according to claim 5 wherein said driven member is a rotatable disc and said surface is an edge thereof, said edge having a plurality of spaced apart inset portion individually engaged by said drive end, said disc being rotated as said drive end moves in engagement with one of said inset portions along the fourth portion of said path.

7. The combination according to claim 6 further comprising holding means positioned above said disc and maintained engaged in one of said inset portions by the force of gravity, said holding means being disengaged from said inset portions by the arm means when the drive end engages another of said inset portions whereby the disc is free to be rotated by the drive end.

8. The combination according to claim 5 wherein said advancing means comprises resilient means connected to said arm means and loaded by movement of the arm means as the drive end moves along said path.

9. The combination according to claim 1 wherein said advancing means holds the follower means in engagement with the first cam contour as the arm means moves along the second and third portions of said path and with the second cam contour as the arm means moves along the fourth portion of said path, said second cam contour having a drop-off point adjacent the maximum radius of its constantly increasing radius portion, said advancing means moving the arm means along said first portion of said path when the follower means reaches the drop-off point.

10. The combination according to claim 9 wherein said advancing means comprises resilient means for urging the follower means against the first and second cam contours and the arm means in the direction of advancement along the first portion of said path.

11. The combination according to claim 1 wherein said follower means is disengaged from said cam contours at the end of the first portion of said path during advancement therealong whereby force on said cam means and drive means due to advancing movement of the arm means is prevented.

12. The combination according to claim 1 further comprising holding means positioned above said driven member and maintained in holding engagement with said driven member by the force of gravity, said holding means being disengageable from said driven member whereby the driven member is free to be advanced by the arm means.

13. The combination according to claim 12 wherein said arm means engages and moves said holding means away from the driven member while said arm means is moving along said path.

References Cited
UNITED STATES PATENTS

| | | | |
|---|---|---|---|
| 747,900 | 12/1903 | Warner | 74—567 |
| 1,403,480 | 1/1922 | Blood | 74—567 |
| 3,465,605 | 9/1969 | Hylan | 74—142 |

FRED C. MATTERN, Jr., Primary Examiner

W. S. RATLIFF, Jr., Assistant Examiner